(12) United States Patent
Bae et al.

(10) Patent No.: US 11,880,421 B2
(45) Date of Patent: Jan. 23, 2024

(54) APPARATUS AND METHOD FOR PROVIDING INDEXING AND SEARCH SERVICE BASED ON IMPORTANT SENTENCE

(71) Applicant: Electronics and Telecommunications Research Institute, Daejeon (KR)

(72) Inventors: Yong-Jin Bae, Daejeon (KR); Joon-Ho Lim, Daejeon (KR); Min-Ho Kim, Daejeon (KR); Hyun Kim, Daejeon (KR); Hyun-Ki Kim, Daejeon (KR); Ji-Hee Ryu, Daejeon (KR); Kyung-Man Bae, Daejeon (KR); Hyung-Jik Lee, Daejeon (KR); Soo-Jong Lim, Daejeon (KR); Myung-Gil Jang, Daejeon (KR); Mi-Ran Choi, Daejeon (KR); Jeong Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/535,466

(22) Filed: Nov. 24, 2021

(65) Prior Publication Data
US 2023/0105610 A1 Apr. 6, 2023

(30) Foreign Application Priority Data
Sep. 29, 2021 (KR) .................. 10-2021-0129127

(51) Int. Cl.
*G06F 16/957* (2019.01)
*G06F 16/31* (2019.01)
(Continued)

(52) U.S. Cl.
CPC .......... *G06F 16/957* (2019.01); *G06F 16/316* (2019.01); *G06F 16/3334* (2019.01); *G06F 40/205* (2020.01)

(58) Field of Classification Search
CPC .. G06F 16/957; G06F 16/316; G06F 16/3334; G06F 40/205
(Continued)

(56) References Cited

U.S. PATENT DOCUMENTS 10,430,468 B2 10/2019 Jeong et al.
2002/0169606 A1* 11/2002 Bantz ................. H04M 3/523
704/235
(Continued)

FOREIGN PATENT DOCUMENTS

KR 1020180032541 A 3/2018
KR 1020210032253 A 3/2021
(Continued)

*Primary Examiner* — Kuen S Lu
(74) *Attorney, Agent, or Firm* — William Park & Associates Ltd

(57) ABSTRACT

Disclosed herein are an apparatus and method for providing a search service based on important sentences. The apparatus for providing a search service based on important sentences includes memory in which at least one program and a previously trained word importance measurement model are recorded and a processor for executing the program. The program may include a word importance measurement unit for measuring the importance of each of multiple words included in input text in the corresponding input text based on the word importance measurement model and a sentence importance measurement unit for measuring the importance of each of at least one sentence included in the text based on the measured importance of each of the multiple words.

11 Claims, 9 Drawing Sheets

(51) Int. Cl.
   *G06F 16/33*      (2019.01)
   *G06F 40/205*     (2020.01)
(58) Field of Classification Search
   USPC .......................................... 707/706
   See application file for complete search history.

(56) References Cited

U.S. PATENT DOCUMENTS

| | | | | |
|---|---|---|---|---|
| 2011/0196927 | A1* | 8/2011 | Vance | G06Q 30/02 |
| | | | | 709/204 |
| 2020/0081909 | A1* | 3/2020 | Li | G06F 40/258 |
| 2021/0026879 | A1 | 1/2021 | Huang et al. | |
| 2022/0083898 | A1* | 3/2022 | Shukla | G06F 40/284 |

FOREIGN PATENT DOCUMENTS

| | | |
|---|---|---|
| KR | 1020210039907 A | 4/2021 |
| KR | 1020210048368 A | 5/2021 |

\* cited by examiner

| WORD | IMPORTANCE | WORD | IMPORTANCE | WORD | IMPORTANCE | WORD | IMPORTANCE | WORD | IMPORTANCE |
|---|---|---|---|---|---|---|---|---|---|
| Lake | 0.9340 | Pu | 0.9106 | Ka | 0.0000 | Ki | 0.0000 | . | -0.0002 |
| Lake | 0.9445 | Pu | 0.9413 | Ka | 0.0000 | Ki | 0.0000 | is | 0.0004 |
| a | 0.0002 | lake | 0.9169 | on | -0.0017 | the | 0.0000 | South | 0.0154 |
| island | 0.0000 | of | 0.0001 | New | 0.0190 | Zealand | 0.0191 | The | 0.0001 |
| area | 0.3546 | of | 0.0001 | the | 0.0002 | lake | 0.9234 | is | -0.0034 |
| 17 | 0.0046 | 8 | 0.0000 | 7 | 0.0000 | km | 0.0024 | 2 | 0.0054 |
| , | 0.0025 | and | | it | 0.0027 | is | 0.0021 | located | 0.0563 |
| at | 0.0003 | 5 | 0.0004 | 18 | 0.0000 | 2 | 0.0000 | m | 0.0061 |
| ~ | -0.0002 | 5 | -0.0021 | 32 | 0.0000 | m | 0.0061 | above | 0.0017 |
| sea | 0.0313 | level | 0.0000 | . | 0.0120 | | | | |

FIG. 3

...(OMITTED)......

| WORD | IMPORTANCE | WORD | IMPORTANCE | WORD | IMPORTANCE | WORD | IMPORTANCE | WORD | IMPORTANCE |
|---|---|---|---|---|---|---|---|---|---|
| leave | 0.5272 | for | -0.0079 | Croatia | 0.2558 | ! | -0.0038 | Croatia | 0.1481 |
| , | -0.0035 | the | 0.9413 | eternal | 0.0130 | gem | 0.0455 | of | -0.0016 |
| the | 0.0002 | Bal | 0.0150 | kans | 0.0000 | , | 0.0000 | is | -0.0022 |
| a | 0.0000 | country | 0.2841 | that | 0.0010 | is | -0.0001 | considered | 0.0089 |
| a | 0.0001 | resort | 0.1202 | that | 0.0002 | all | 0.0110 | Europeans | 0.1272 |
| want | 0.1261 | to | 0.0000 | visit | 0.1777 | at | -0.0031 | least | 0.0122 |
| once | 0.0198 | . | Pli | 0.0207 | 0.0027 | t | 0.0000 | vi | 0.0000 |
| ce | 0.0000 | Lakes | 0.0364 | National | 0.0329 | Park | 0.0239 | , | -0.0021 |
| which | -0.0002 | became | 0.0038 | the | 0.0000 | motive | 0.01587 | of | 0.0017 |
| , | 0.0313 | A | 0.2855 | va | 0.0000 | tar | 0.0000 | , | -0.0001 |

...(OMITTED)......

EXISTING SEARCH OUTPUT

LAKE PUKAKI

SENTENCE 1: LAKE TEKAPO HAS MADE ME FEEL THE BEAUTY OF NATURE IN NEW ZEALAND WITH ITS SPECTACULAR SUNRISE...(OMITTED)...
SENTENCE 2: THE REASON IS THAT AFTER LEAVING LAKE TEKAPO, THE LANDSCAPE IS EVEN MORE WONDERFUL.
SENTENCE 3: THE DESTINATION THIS TIME IS LAKE TEKAPO, WHERE WE WILL TAKE A LAKE TOUR.

SENTENCE 1: HI, THIS IS THE RACCOON FAMILY, THE CORRESPONDENT IN NEW ZEALAND OF TRIPPLUS.
SENTENCE 2: DUE TO COVID-19 WHICH STARTED IN WUHAN, CHINA, FLIGHTS OUTBOUND FROM KOREA...(OMITTED)...
SENTENCE 3: NOT ONLY CHINA, BUT ALSO JAPAN, VIETNAM, THAILAND, SINGAPORE, AND HONG KONG, WHERE MANY KOREANS VISIT...(OMITTED)...

SENTENCE 1: I LOVE CROATIA.
SENTENCE 2: INTRODUCTION OF THE PROGRAM
SENTENCE 3: JEONGYEON OH AND SONGHYON CHOI, THE FAMOUS FORMER BROADCAST ANNOUNCERS, ...(OMITTED)...

SEARCH OUTPUT OF PROPOSED INVENTION

LAKE PUKAKI

SENTENCE 6: YOU WILL NOT NEED ANY EXPLANATION THE MOMENT YOU SEE THE BEAUTY OF LAKE PUKAKI WITH YOUR EYES.
SENTENCE 7: I WAS SO IMPRESSED BY THE LAKE THAT I IMAGINED IF THERE WERE A LAKE IN HEAVEN, IT WOULD LIKE THIS.
SENTENCE 10: I WAS CONTINUOUSLY IMPRESSED FROM THE MOMENT I SAW LAKE PUKAKI TO THE MOMENT I GOT OFF AND LOOKED AROUND.

SENTENCE 12: AT LAKE PUKAKI, 'BEST SALMON'HAT IS PRAISED AS THE BEST BY MANY TOURISTS ...(OMITTED)...
SENTENCE 11: IF YOU CONTINUE TO WALK ALONG LAKE PUKAKI AND TURN NORTH HERE, YOU WILL FIND MOUND COOK, A FAMOUS MOUNTAIN WELL KNOWN AMONG THE SOUTH ALPS.

SENTENCE 3: JEONGYEON OH AND SONGHYON CHOI, THE FAMOUS FORMER BROADCAST ANNOUNCERS, LEAVE FOR CROATIA...(OMITTED)...
SENTENCE 4: THROUGH A PROGRAM AIRED ON A CABLE CHANNEL LAST YEAR...(OMITTED)...
SENTENCE 5: THE WOMEN' TRIP ON A YACHT ...(OMITTED)...

APPARATUS AND METHOD FOR PROVIDING INDEXING AND SEARCH SERVICE BASED ON IMPORTANT SENTENCE

CROSS REFERENCE TO RELATED APPLICATION

This application claims the benefit of Korean Patent Application No. 10-2021-0129127, filed Sep. 29, 2021, which is hereby incorporated by reference in its entirety into this application.

BACKGROUND OF THE INVENTION

1. Technical Field

The disclosed embodiment relates to technology for providing a search service.

2. Description of the Related Art

There are various search service provision systems for providing a search function. Service providers that provide such a search function continually try to improve the accuracy of information requested by users, search convenience, and the like. However, despite such efforts, the various existing search systems have the following limitations in common.

In an indexing method used in general search systems, indexing is performed on the assumption that the words used in the entirety of the text of a target document have the same importance. In this indexing method, the subject or the intention of the writer of the document is neither grasped nor reflected, and there is a problem in that it is difficult to catch the subject or intention through indexing. This problem may not be serious for short documents, but for longer documents, information that is not directly related to the subject is included in indexes, which may increase the possibility of degrading the quality of search results. That is, when the entirety of a document is indexed, as the length of the document increases, unnecessary information is used for indexing, as described above, which degrades the quality of search results.

Meanwhile, search results provided by general web search engines (Google, Naver, and the like) may be content that starts from the beginning of the text or snippets preceding and following a word matching the search term of a user. Accordingly, a search result merely includes vocabulary matching a search term, and it is difficult to check whether the search result includes the core content corresponding to the search intention of a user. For example, when a web search is performed using the search term 'Lake Pukaki', search results retrieved from travel-related text because 'Lake Pukaki' is merely included therein, rather than a description of Lake Pukaki, are provided. That is, it is likely for a web page including, as hash tags thereof, #racoon-family, #New Zealand, #Queenstown, #tram, or the like, rather than a page on Lake Pukaki, to be retrieved, because various pieces of information are included in the long text. Also, because the beginning of text is provided to a user as a search result, it is difficult to know which content about Lake Pukaki is included therein. The user has to check the search results one by one, or it is likely that the user glances at only the front part of the text provided as the search results, regards the results as a failure, and terminates the search service. That is, because the information required by a user is text that is written to match a required query, service for providing a user with a result focused on the core content of text is required when the service is provided.

Meanwhile, various tests and techniques have been introduced in the search field since the adoption of deep-learning technology, and detecting the context and semantic information of a document is an object of focus, but it is still difficult to use the same in practical application because responding with search results in real time incurs a high computational load.

SUMMARY OF THE INVENTION

An object of the disclosed embodiment is to index the important sentences in a document, thereby making it easy to detect the subject and intention of the document.

Another object of the disclosed embodiment is to raise the quality of search results to a higher level by taking into consideration the query requirements of a user and the intention of a text writer and to provide a search service capable of improving user satisfaction for the service.

A further object of the disclosed embodiment is to improve search speed by applying deep-learning technology.

An apparatus for providing a search service based on important sentences according to an embodiment includes memory in which at least one program and a previously trained word importance measurement model are recorded and a processor for executing the program. The program may include a word importance measurement unit for measuring the importance of each of multiple words included in input text in the input text based on the word importance measurement model and a sentence importance measurement unit for measuring the importance of each of at least one sentence included in the text based on the measured importance of each of the multiple words.

Here, the word importance measurement model may be configured with neural layers trained in advance using training data in which respective encoded values of the multiple words included in the text are labeled with '0' or '1' depending on importance in context.

Here, the label may be selectively attached in an automatic or manual manner depending on whether the format of the text is standardized.

Here, the word importance measurement unit may output a result in which the multiple words included in the input text are displayed using a color or shade depending on importance scores of the multiple words.

Here, the sentence importance measurement unit may select words having an importance score equal to or greater than a first threshold from among multiple words included in the sentence and calculate a sentence importance score based on the selected words.

Here, the sentence importance measurement unit may perform extracting at least one piece of attribute information based on importance scores of the multiple words included in the sentence and calculating the sentence importance score by assigning weights to the extracted at least one piece of attribute information.

Here, extracting the at least one piece of attribute information may include at least one of calculating the average of the importance scores of the multiple words; calculating the number of words having an importance score equal to or greater than a predetermined second threshold, among the multiple words; and calculating the number of words corresponding to content words based on parts of speech.

Here, the sentence importance measurement unit may rank multiple sentences according to the calculated sentence importance scores.

Here, the apparatus may further include an indexing unit for extracting a sentence to be indexed based on a sentence important score measured by the sentence importance measurement unit and indexing the extracted sentence.

Here, the sentence importance measurement unit may rank multiple sentences in the order of the calculated sentence importance scores and the indexing unit may perform indexing after excluding sentences having low rankings.

Here, the apparatus may further include a search unit for retrieving and outputting text corresponding to queried information in response to input of the queried information and extracting and outputting indexed important sentences.

Here, when the queried information is a sentence, the search unit may acquire importance scores of multiple words included in a queried sentence by inputting the queried sentence to the word importance measurement unit and perform retrieval based on words having high importance scores.

An indexing method based on important sentences according to an embodiment may include measuring the importance of each of multiple words included in input text in the input text based on a previously trained word importance measurement model; measuring the importance of each of at least one sentence included in the text based on the measured importance of each of the multiple words; and extracting sentences to be indexed based on measured sentence importance scores and indexing the extracted sentences.

Here, measuring the importance of each of the at least one sentence may comprise selecting words having an importance score equal to or greater than a first threshold from multiple words included in the sentence and calculating the sentence importance score based on the selected words.

Here, measuring the importance of each of the at least one sentence may include extracting at least one piece of attribute information based on importance scores of the multiple words included in the sentence; and calculating the sentence importance score by assigning weights to the extracted at least one piece of attribute information.

Here, extracting the at least one piece of attribute information may include at least one of calculating the average of the importance scores of the multiple words; calculating the number of words having an importance score equal to or greater than a predetermined second threshold, among the multiple words; and calculating the number of words corresponding to content words based on parts of speech.

Here, the indexing method may further include ranking multiple sentences according to the calculated sentence importance scores, and indexing the extracted sentences may comprise indexing the extracted sentences after excluding sentences having low rankings.

A search method based on important sentences according to an embodiment may include retrieving important sentences having an index corresponding to queried information in response to input of the queried information and outputting text including the retrieved important sentences along with the important sentences.

Here, the search method may further include, when the queried information is a sentence, measuring an importance score of each of multiple words included in a queried sentence, and retrieving the important sentences may comprise performing retrieval based on words having a high importance score.

BRIEF DESCRIPTION OF THE DRAWINGS

The above and other objects, features, and advantages of the present invention will be more clearly understood from the following detailed description taken in conjunction with the accompanying drawings, in which:

FIGS. 3 and 4 are examples of word importance inference results according to an embodiment;

FIG. 8 is an exemplary view for comparing search service results according to the conventional art with those according to an embodiment.

DESCRIPTION OF THE PREFERRED EMBODIMENTS

Figure 1:
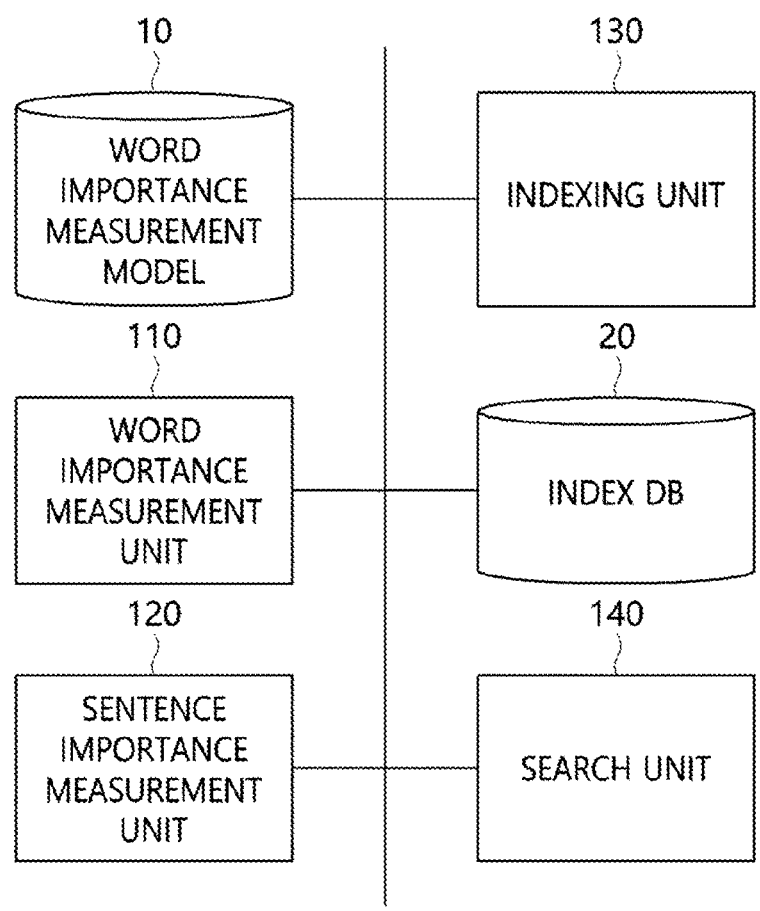
FIG. 1 is a schematic block diagram of an apparatus for providing an indexing and search service based on important sentences according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for providing an indexing and search service based on important sentences according to an embodiment will be described in detail with reference to FIGS. 1 to 9.

FIG. 1 is a schematic block diagram of an apparatus for providing an indexing and search service based on important sentences according to an embodiment.

Referring to FIG. 1, an apparatus 100 for providing an indexing and search service based on important sentences according to an embodiment (referred to as an 'apparatus' hereinbelow) indexes important sentences in a document and provides search results based on the important sentences when it provides a search service.

To this end, the apparatus 100 may include a word importance measurement unit 110, a sentence importance measurement unit 120, an indexing unit 130, and a search unit 140. Additionally, the apparatus 100 may further include a word importance measurement model 10 and an index DB 20.

The word importance measurement unit 110 may measure the importance of each of multiple words included in input text in the corresponding input text using the word importance measurement model 10.

Here, an importance score may have a value ranging from 0.0 to 1.0 ('0.0~1.0').

The word importance measurement model 10 may be trained in advance based on deep learning by the word importance measurement unit 110. That is, the word importance measurement model 10 is trained so as to infer the importance of each word included in input text in consideration of the context of the input text. A detailed description of inferencing performed by the word importance measurement model 10 will be made later with reference to FIGS. 2 to 4.

The sentence importance measurement unit 120 may measure the importance of each of at least one sentence included in the text based on the measured importance of the multiple words. A detailed description of the operation of the sentence importance measurement unit 120 will be made later with reference to FIG. 5.

The indexing unit 130 extracts the sentence to be indexed based on the sentence importance score measured by the sentence importance measurement unit 120 and indexes the extracted sentence. Information about indexing of important sentences is stored in the index DB 20. A detailed description of the operation of the indexing unit 130 will be made later with reference to FIG. 6.

The search unit 140 retrieves and outputs text corresponding to queried information in response to input thereof, in which case the indexed important sentences may be extracted and output. A detailed description of the operation of the search unit 140 will be made later with refence to FIGS. 7 and 8.

Figure 2:
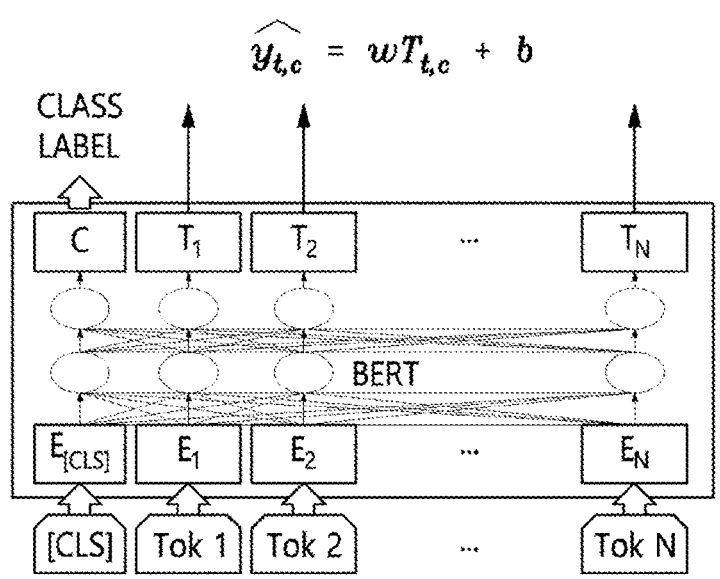
FIG. 2 is a view for explaining a method for training a word importance inference model based on a BERT language model according to an embodiment.

FIG. 2 is a view for explaining a method for training a word importance inference model based on a BERT language model according to an embodiment.

Referring to FIG. 2, $\widehat{y_{t,c}} = wT_{t,c} + b$ is an equation for performing training while updating a weight parameter w in order to determine whether each of the encoded values ($T_1$, $T_2$, $T_3$, ... ) of individual words (Tok1, Tok2, ... ) in text is important.

The word importance inference model may be configured with neural layers that are trained in advance using training data in which the encoded value of each of multiple words included in text is labeled with '0' or '1' depending on the importance of the word in the context.

Here, the label may be selectively attached in an automatic or manual manner depending on whether the format of text is standardized.

Here, according to an embodiment, an importance label for each of the individual words included in the text may be attached in a manual manner. This may be performed when the training data is text having a format that is not standardized.

Also, according to another embodiment, the individual words included in the text are automatically sorted according to predetermined criteria, and the label may be automatically attached depending on the sorting result. This may be performed when the training data is text in a standardized format.

For example, when text has a format in which a title and content are separated, as in news or a post, words used in the title are assumed to be important words and are tagged with the label '1', and words that are not included in the title are tagged with the label '0'. Accordingly, the word importance measurement model trained using training data generated as described above sets the importance scores of the words included in the title of text to be higher. As a result, data in which a title and paragraphs are separated is capable of being used as training data, and a word importance inference model based on deep learning may be efficiently constructed.

The word importance measurement unit 110 infers the importance of words included in input text based on the word importance measurement mode 10, which is trained as described above.

An example of the input text may be that illustrated in Table 1 below.

TABLE 1

[Input Example 1]
Lake Pukaki.
Lake Pukaki is a lake on the South Island of New Zealand.
The area of the lake is 178.7 km², and it is located at 518.2 m~532 m above the sea level.
[Input Example 2]
Love Croatia.
Program Guide.
- Jeongyeon Oh and Songhyon Choi, the famous former broadcast announcers in Korea, leave for Croatia! Croatia, the eternal gem of the Balkans, is a country that is
considered a resort that
all Europeans want to visit at least once. Plitvice Lakes National Park, which became the motive of the movie 'Avatar', or . . . (omitted) . . .
Croatia is soaring in popularity as a country that Koreans want to visit the most due to a TABLE 1-continued program aired on a cable channel last year, and Jeongyeon Oh and Songhyon Choi leave for Croatia.
A group of female friends takes a trip on a yacht! They travel around a popular Croatian island to explore the charms hidden there.

[Input Example 1] is an example describing Lake Pukaki, and [Input Example 2] is an example describing a trip to Croatia and information related thereto.

FIGS. 3 and 4 are examples of a result of inference of word importance according to an embodiment.

Referring to FIGS. 3 and 4, both [Input Example 1] and [Input Example 2] include the same word, namely 'Lake'. However, the importance score of 'Lake' in [Input Example 1], which is a description of Lake Pukaki, is determined to be a high score, '0.91~0.94', but the importance score of 'Lake' in [Input Example 2] is determined to be '0.03', which is lower than that of [Input Example 1].

On the other hand, in [Input Example 2], which is information about a trip to Croatia and information related thereto, the importance scores of words such as 'trip', 'leave', 'Croatia', and 'country' are measured as being high.

That is, it can be seen that importance scores for the same words may be inferred to be different in respective documents depending on the main content of the documents. Also, the same words in the same text may have different importance scores depending on the peripheral context.

Meanwhile, the word importance measurement unit 110 may output a result in which multiple words included in input text are displayed using a color or shade based on the importance scores thereof.

Although not illustrated in FIGS. 3 and 4, the word importance inference result may be displayed using a different color or shade based on the importance score. For example, the higher the importance score, the closer to green the color thereof, but the lower the importance score, the closer to red the color thereof.

Figure 5:
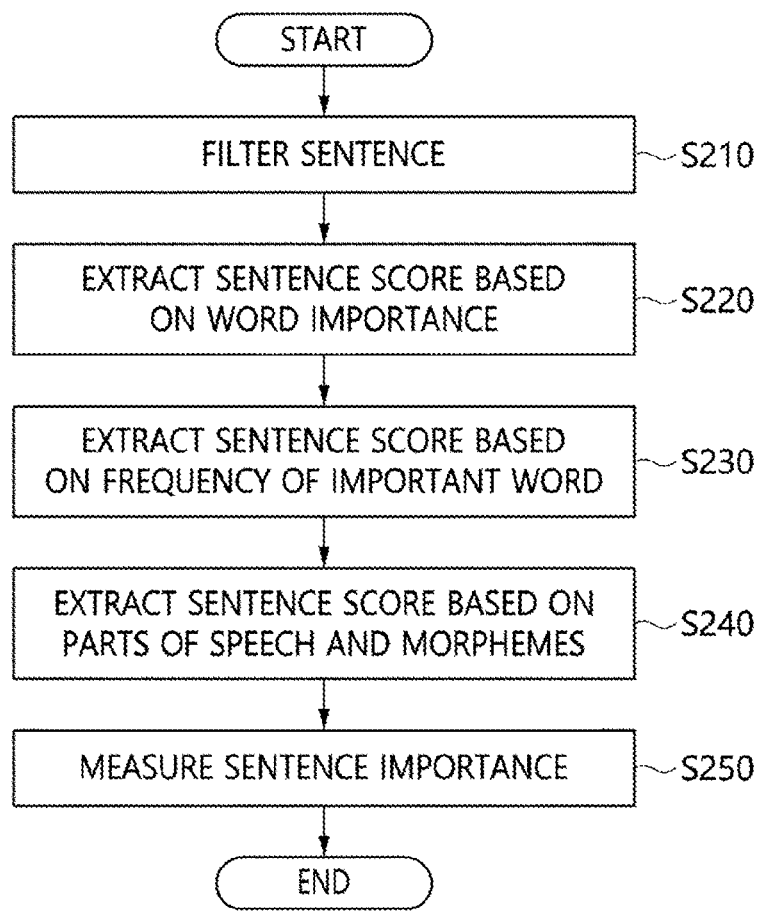
FIG. 5 is a flowchart for explaining the operation of a sentence importance measurement unit according to an embodiment.

FIG. 5 is a flowchart for explaining the operation of a sentence importance measurement unit according to an embodiment.

Referring to FIG. 5, the sentence importance measurement unit 120 first filters sentences included in text at step S210 based on the word importance score result inferred by the word importance measurement unit 110.

That is, words having an importance score equal to or greater than a first threshold are selected from among multiple words included in a sentence, and the sentence importance score may be calculated based on the selected words.

For example, when the first threshold of the word importance score for filtering sentences is set to '0.2', the sentences in the first and second lines in [Input Example 2] in Table 1 are filtered out because the importance scores of the words included in the corresponding sentences are less than the first threshold, as shown in Table 2 below.

TABLE 2

| love/ | −0.0034 | Croatia | 0.1906 | . | −0.0040 |
| program | 0.1041 | guide | 0.0090 | . | −0.0068 |

That is, it is likely that a sentence configured with words having an importance score lower than the first threshold acts as noise, because it is irrelevant to the main information of a document when a search is performed. Also, the word 'Croatia' is an important word in [Input Example 2], but it also appears in other sentences, so there is less concern of omission of important information.

Subsequently, the sentence importance measurement unit 120 extracts at least one piece of attribute information at steps S220 to S240 based on the importance scores of the multiple words included in the sentence.

Here, extracting at least one piece of attribute information at steps S220 to S240 may include calculating the average of the importance scores of the multiple words at step S220.

That is, the sentence importance measurement unit 120 calculates the score of each of the sentences included in text based on the word importance score result inferred by the word importance measurement unit 110, as shown in Equation (1) below:

$$\text{sentence\_weight}_i = \frac{\sum_{k=1}^{n}(\text{word\_context\_weight}(T_k))}{n} \quad (1)$$

As shown in Equation (1), the sentence importance (sentence_weight) may be calculated as the sum of the importance scores (word_context_weight($T_k$)) of the respective words included in the sentence. Here, the longer the sentence, the greater the sum of the importance scores. Accordingly, the sentence importance (sentence_weight) is calculated in consideration of the number (n) of words included in the sentence, as shown in Equation (1). That is, the sentence importance (sentence_weight$_i$) is calculated as the average of the importance scores of the words constituting the sentence, as shown in Equation (1).

Also, extracting at least one piece of attribute information at steps S220 to S240 may include calculating the importance score of the sentence at step S230 by taking into consideration the proportion of the number of words having an importance score equal to or greater than a predetermined second threshold, among the multiple words. This compensates for the sentence importance score calculated at step S220, because the sentence is likely to earn a high score if the sentence is short and includes only some words having a high importance score.

Also, extracting at least one piece of attribute information at steps S220 to S240 may include extracting the sentence score based on the number of words corresponding to content words based on parts of speech at step S240.

Here, content words and functional words are separated from each other in consideration of the morpheme types of words in a sentence, and the proportion of the content word importance is measured.

Here, parts of speech corresponding to content words may include nouns, verbs, adjectives, and adverbs. Also, parts of speech corresponding to functional words may include conjunctions, prepositions, pronouns, and articles.

Here, the sentence score may be changed to the average of the importance scores, as shown in Equation (1), or may be calculated as the frequency of important words, as at step S230.

The sentence importance measurement unit 120 may calculate the sentence importance score by assigning weights to the at least one extracted piece of attribute information.

Subsequently, the sentence importance measurement unit 120 measures the sentence importance at step S250 based on at least one of the sentence scores calculated at steps S220 to S240.

The sentence importance score at step S250 may be calculated using Equation (2) below:

first-phase attribute*a+second-phase attribute*b+ third-phase attribute*c        (2)

In Equation (2), a, b, and c may be respective weights of the attributes.

Table 3 below is an example output from the sentence importance measurement unit 120 in response to [Input Example 2] in Table 1 above.

The sentence importance measurement unit 120 assumes that the weights a, b, and c are 1 when it calculates the sentence scores for [Input Example 2] using Equation (2) above.

TABLE 3

| sentence no. | sentence | state | attribute 1 | attribute 2 | attribute 3 | sentence score |
|---|---|---|---|---|---|---|
| 1 | Love Croatia | filtered out | | | | |
| 2 | Program Guide | filtered out | | | | |
| 3 | Jeongyeon Oh and Songhyon Choi, the famous former broadcast announcers in Korea, leave for Croatia! Croatia, the eternal gem of the Balkans, . . . (omission) | maintained | 0.0415 | 0.8 | 2.9999 | 3.8414 |
| 4 | Croatia is soaring in popularity as a country that Koreans want to visit the most due to a program aired on a cable channel last year . . . (omission) | maintained | 0.0689 | 0.8 | 2.8254 | 3.6943 |
| 5 | A group of female friends takes a trip on a yacht! They travel around a popular Croatian island to explore the charms hidden there. | maintained | 0.0364 | 0.2 | 1.1362 | 1.3726 |

Referring to Table 3, sentences corresponding to sentence numbers 1 and 2 are filtered out because they do not contain important words, and the above-described steps S220 to S250 are performed on sentences corresponding to sentence numbers 3 to 5, whereby the sentence scores thereof are calculated using Equation (2) based on the calculated attributes 1 to 3.

Here, the sentence importance measurement unit 120 may rank the multiple sentences according to the calculated sentence importance scores thereof. Accordingly, when a search is performed, indexing may be performed, or a search result may be provided according to the rankings of the sentences.

Here, the indexing unit 130 may perform indexing after it excludes sentences having low rankings. Because the importance of a sentence may vary depending on a query when a search is performed, a sentence to be provided as an answer is not set in advance, and the rankings may be calculated depending on context information and the importance of words and sentences.

Figure 6:
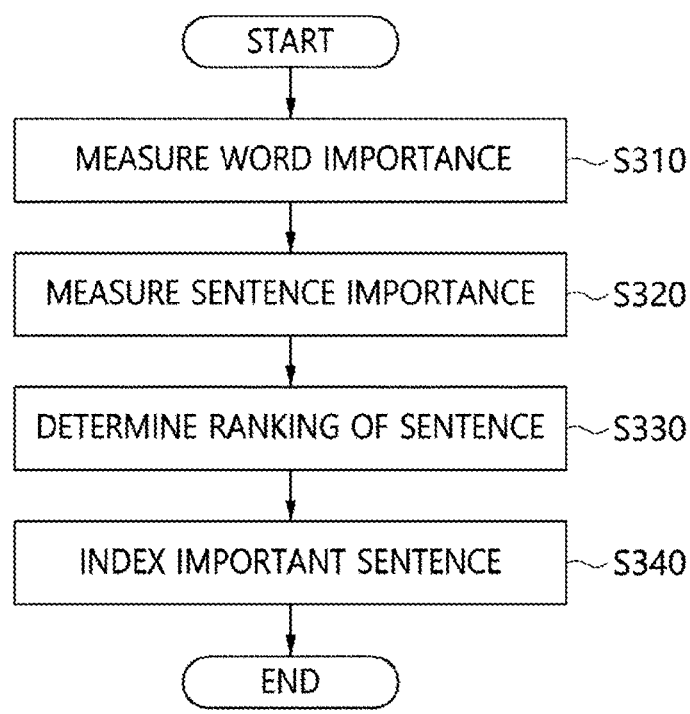
FIG. 6 is a flowchart for explaining an indexing method based on important sentences according to an embodiment.

FIG. 6 is a flowchart for explaining an indexing method based on important sentences according to an embodiment.

Referring to FIG. 6, the indexing method based on important sentences according to an embodiment may include measuring the importance of each of multiple words included in input text in the corresponding text at step S310 based on a previously trained word importance measurement model, measuring the importance of each of at least one sentence included in the text at step S320 based on the measured importance of the multiple words, extracting the sentence to be indexed based on the measured sentence important scores, and indexing the extracted sentences at step S340.

Here, measuring the importance of each sentence at step S320 may comprise selecting words having an importance score equal to or greater than a first threshold, among multiple words included in the sentence, and calculating the sentence importance score based on the selected words.

Here, measuring the importance of each sentence at step S320 may include extracting at least one piece of attribute information based on the importance scores of the multiple words included in the sentence and calculating the sentence importance score by assigning weights to the at least one extracted piece of attribute information.

Here, extracting the at least one piece of attribute information may include at least one of calculating the average of the importance scores of the multiple words, calculating the number of words having an importance score equal to or greater than a predetermined second threshold, among the multiple words, and calculating the number of words corresponding to content words based on parts of speech.

Here, the indexing method based on important sentences according to an embodiment may further include ranking multiple sentences at step S330 in the order of the calculated sentence importance scores thereof, and indexing may be performed after sentences having low rankings are excluded.

Figure 7:
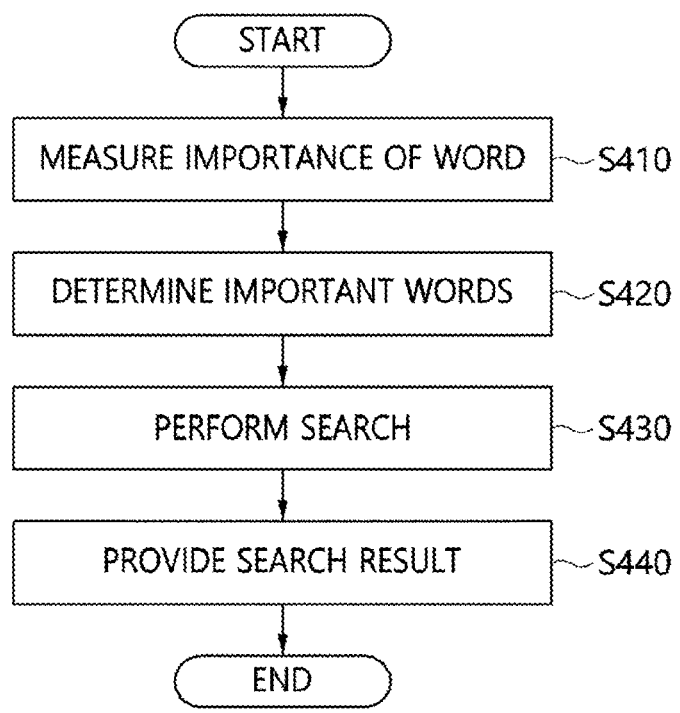
FIG. 7 is a flowchart for explaining a search method based on important sentences according to an embodiment.

FIG. 7 is a flowchart for explaining a search method based on important sentences according to an embodiment.

Referring to FIG. 7, the search method based on important sentences according to an embodiment may include retrieving important sentences having an index corresponding to queried information at steps S410 to S430 in response to input of the queried information and outputting text including the retrieved important sentences along with the important sentences at step S440.

Here, when the queried information is a sentence, retrieving the important sentences at steps S410 to S430 may further include measuring the importance scores of multiple words included in the queried sentence at step S410 and determining important words based on the importance scores at step S420, and retrieval may be performed based on words having a high importance score. That is, when a natural-language question or search term is input from a user, which words are important in the question may be determined.

For example, when the question "Who is the member that left the girl group named 'Apink' in 2013?" is input, Table 4 below shows an example of the generated query.

TABLE 4

| word | Who, is, the, member, that, left, the, girl group, named, ', Apink, ', in, 2013, ? |
|---|---|
| word importance | 0.0001, 5e–05, 8e–05, 0.26495, 0.0001, 0.32756, 5e–05, 0.58717, 0.0001, 9e–05, 0.94542, 9e–05, 0.0001, 0.26495, 5e–05 |
| filtered out from query | the, that, in, ? |
| generated query | girl group^0.587 Apink^0.945 2013^0.020 left^0.327 member^0.264 |

Here, the words are the result of morphological analysis performed on the queried information, and the word importance scores may be generated by the above-described word importance measurement unit 110.

Here, determining the important words at step S420 comprises filtering out words having low importance based on the importance scores calculated at step S410. For example, the importance of a word is inferred in such a way that words such as conjunctions, prepositions, pronouns, articles, special characters, and the like have low importance and that the words 'Apink', 'girl group', 'and 'left' have high importance, descending in the order in which they are listed, as shown in Table 4.

Accordingly, retrieving the important sentences at steps S410 to S430 comprises generating a query including important words, as shown in Table 4, and retrieval is performed based on the generated query, whereby retrieval may be performed in the state in which the word importance is reflected in the query.

Meanwhile, outputting the text at step S440 comprises outputting a search result that is retrieved from the important sentences selected at the step of indexing the important sentences.

FIG. 8 is an exemplary view for comparing an output search result according to an embodiment with that according to the conventional art.

FIG. 8 illustrates an example presenting the search result for 'Lake Pukaki', and the search result output by an existing search engine and the search result output by an embodiment are illustrated on the left and right sides, respectively.

Referring to the search result returned by an existing search engine, because sentences, which are a portion of the retrieved text, are sequentially presented as the result, and because only a limited length thereof is presented, even though the result has no content about 'Lake Pukaki', the result is output as the initial search result. In this case, in order for a user to find out the actual content of the entire document, the user has to open the document by inputting a user-selected signal, such as a mouse click. Also, in the case where the user opens the document and checks the same, it is not easy to detect the location of content matching the content queried by the user in the entire document.

On the other hand, referring to the search result according to an embodiment, the result having a limited length and including only the important sentences is presented. In this case, because a sentence having high importance in the entire document is preferentially presented as the search result, there is no need to open the entire document, and it is possible to know the location of the content required by the user in the entire document.

Figure 9:
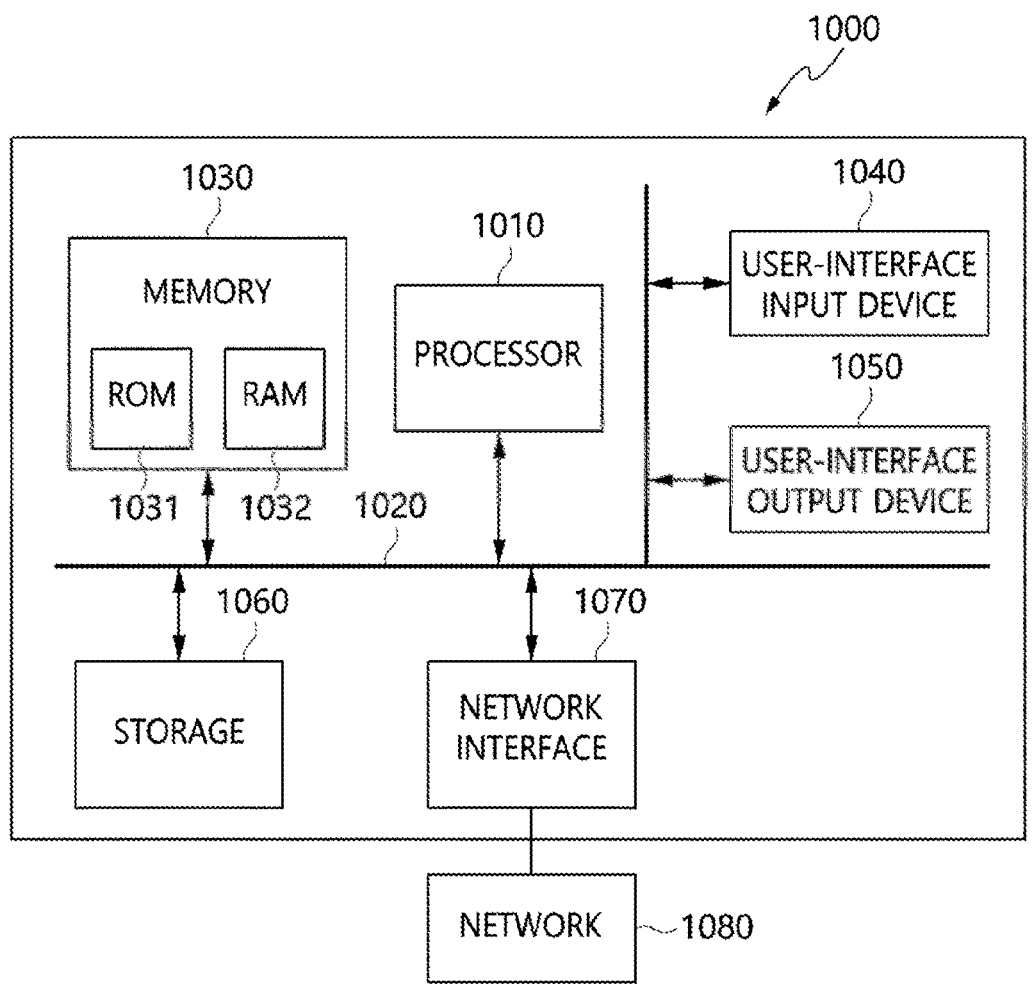
FIG. 9 is a view illustrating a computer system configuration according to an embodiment.

FIG. 9 is a view illustrating a computer system configuration according to an embodiment.

The apparatus for providing an indexing and search service based on important sentences according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to the disclosed embodiment, indexing is performed with a focus on important sentences in text, whereby a document that is written to match the query of a service user and the intention of the writer of the text may be retrieved.

Also, when indexing and a search are performed using important sentences in text according to the disclosed embodiment, documents that do not match the intention of a text writer are not provided as search results, even when the search term entered by a user matches some of the text, whereby user satisfaction may be improved.

Also, according to the disclosed embodiment, when search results are provided using a word importance inference model based on deep learning, the user requirements for information may be quickly and accurately satisfied.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for providing a search service based on important sentences, comprising:
   memory in which at least one program and a previously trained word importance measurement model are recorded; and
   a processor for executing the program,
   wherein the program includes a word importance measurement unit for measuring an importance of each of multiple words included in input text in the input text based on the word importance measurement model; and a sentence importance measurement unit for measuring an importance of each of at least one sentence included in the text based on the measured importance of each of the multiple words, wherein the sentence importance measurement unit performs extracting at least one piece of attribute information based on importance scores of the multiple words included in the sentence and calculating the sentence importance score by assigning weights to the extracted at least one piece of attribute information, wherein extracting the at least one piece of attribute information includes at least one of calculating an average of the importance scores of the multiple words;

calculating the first number of words having an importance score equal to or greater than a predetermined second threshold, among the multiple words; and calculating the second number of words corresponding to content words based on parts of speech, wherein calculating the sentence importance score includes:

assigning weights to each of at least one of the average, the first number and the second number: and summing the results of assigning weights to each of at least one of the average, the first number and the second number.

2. The apparatus of claim 1, wherein the word importance measurement model is configured with neural layers trained in advance using training data in which respective encoded values of the multiple words included in the text are labeled with '0' or '1' depending on importance in context.

3. The apparatus of claim 2, wherein the label is selectively attached in an automatic or manual manner depending on whether a format of the text is standardized.

4. The apparatus of claim 3, wherein the label for each of the individual words included in the text is attached in a manual manner when the format of the text is not standardized, or the label is automatically attached depending on the sorting result after the individual words included in the text are automatically sorted according to predetermined criteria when the format of the text is standardized.

5. The apparatus of claim 1, wherein the word importance measurement unit outputs a result in which the multiple words included in the input text are displayed using a color or shade depending on importance scores of the multiple words.

6. The apparatus of claim 1, wherein the sentence importance measurement unit selects words having an importance score equal to or greater than a first threshold from among multiple words included in the sentence and calculates a sentence importance score based on the selected words.

7. The apparatus of claim 1, wherein the sentence importance measurement unit ranks multiple sentences according to the calculated sentence importance scores.

8. The apparatus of claim 1, further comprising:

an indexing unit for extracting a sentence to be indexed based on a sentence important score measured by the sentence importance measurement unit and indexing the extracted sentence.

9. The apparatus of claim 8, wherein the sentence importance measurement unit ranks multiple sentences in an order of the calculated sentence importance scores and the indexing unit performs indexing after excluding sentences having low rankings.

10. The apparatus of claim 1, further comprising:

a search unit for retrieving and outputting text corresponding to queried information in response to input of the queried information and extracting and outputting indexed important sentences.

11. The apparatus of claim 10, wherein, when the queried information is a sentence, the search unit acquires importance scores of multiple words included in a queried sentence by inputting the queried sentence to the word importance measurement unit and performs retrieval based on words having high importance scores.

* * * * *